United States Patent
Schindelholz et al.

(10) Patent No.: US 10,150,873 B2
(45) Date of Patent: Dec. 11, 2018

(54) NANOCOMPOSITE CONFORMAL CORROSION BARRIER COATING

(71) Applicants: National Technology & Engineering Solutions of Sandia, LLC, Albuquerque, NM (US); Jaime C. Grunlan, College Station, TX (US)

(72) Inventors: Eric John Schindelholz, Albuquerque, NM (US); Erik David Spoerke, Albuquerque, NM (US); Neil R. Sorensen, Albuquerque, NM (US); Jaime C. Grunlan, College Station, TX (US)

(73) Assignees: National Technology & Engineering Solutions of Sandia, LLC, Albuquerque, NM (US); The Texas A&M University System, College Station, TX (US)

( * ) Notice: Subject to any disclaimer, the term of this patent is extended or adjusted under 35 U.S.C. 154(b) by 0 days.

(21) Appl. No.: 16/008,994

(22) Filed: Jun. 14, 2018

(65) Prior Publication Data
US 2018/0298200 A1    Oct. 18, 2018

Related U.S. Application Data

(63) Continuation-in-part of application No. 15/603,877, filed on May 24, 2017, now Pat. No. 10,002,983.
(Continued)

(51) Int. Cl.
| | | |
|---|---|---|
| C09D 5/08 | (2006.01) | |
| C09D 133/02 | (2006.01) | |
| C09D 139/02 | (2006.01) | |
| C09D 179/02 | (2006.01) | |
| H01L 31/048 | (2014.01) | |

(52) U.S. Cl.
CPC ............ *C09D 5/08* (2013.01); *C09D 133/02* (2013.01); *C09D 139/02* (2013.01); *C09D 179/02* (2013.01)

(58) Field of Classification Search
CPC ... H01L 31/048; H01L 31/0481; C08K 3/346; C08L 33/02; C08L 79/02; C08L 2203/204; C09D 5/08
See application file for complete search history.

(56) References Cited

U.S. PATENT DOCUMENTS

| | | | | |
|---|---|---|---|---|
| 10,059,080 B2* | 8/2018 | Luinge | ............. | B32B 5/26 |
| 2011/0120546 A1* | 5/2011 | Nesbitt | ............ | C09D 175/16 |
| | | | | 136/256 |

(Continued)

*Primary Examiner* — Susan D Leong
(74) *Attorney, Agent, or Firm* — Kevin W. Bieg

(57) ABSTRACT

Metals across all industries demand anti-corrosion surface treatments and drive a continual need for high-performing and low-cost coatings. Ordered thin films comprising aligned inorganic platelets dispersed in a polyelectrolyte polymer matrix provide a new class of transparent conformal barrier coatings for protection in corrosive atmospheres. For example, films assembled via layer-by-layer deposition, as thin as 90 nm, are shown to reduce copper corrosion rates by >1000× in an aggressive $H_2S$ atmosphere. These coatings can provide high-performing anti-corrosion treatment alternatives to costlier, more toxic, and less scalable thin films, such as graphene, hexavalent chromium, or atomic layer deposited metal oxides.

15 Claims, 4 Drawing Sheets

Related U.S. Application Data

(60) Provisional application No. 62/342,090, filed on May 26, 2016.

(56) References Cited

U.S. PATENT DOCUMENTS

| | | | |
|---|---|---|---|
| 2014/0069497 A1* | 3/2014 | Hwang | H01L 31/02167 136/256 |
| 2015/0243928 A1* | 8/2015 | Grunlan | C08J 7/045 428/216 |
| 2016/0264820 A1* | 9/2016 | Kikuchi | C09D 183/04 |

* cited by examiner

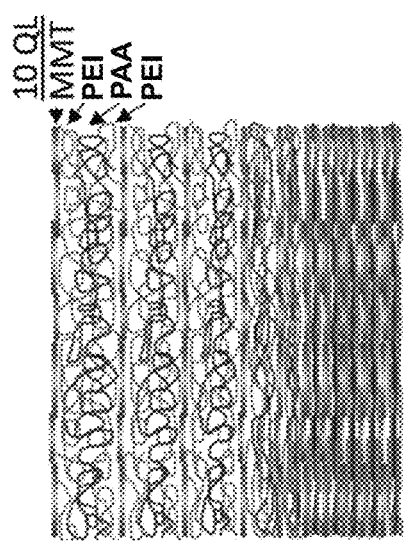
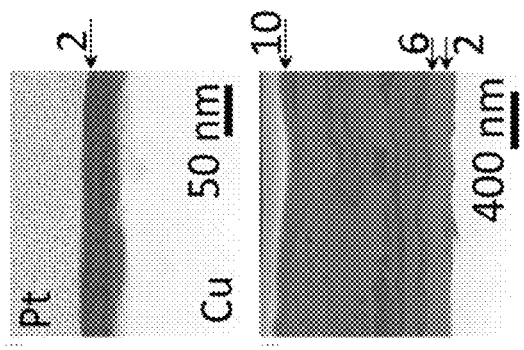
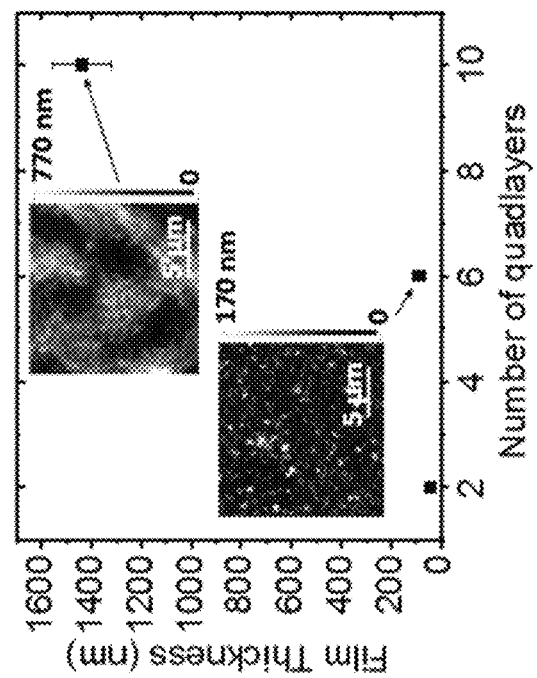
FIG. 2A    FIG. 2B    FIG. 2C    FIG. 2D

NANOCOMPOSITE CONFORMAL CORROSION BARRIER COATING

CROSS-REFERENCE TO RELATED APPLICATIONS

This application is a continuation-in-part of U.S. application Ser. No. 15/603,877, filed May 24, 2017, which claims the benefit of U.S. Provisional Appl. No. 62/342,090, filed May 26, 2016, both of which are incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to corrosion protection and, in particular, to a nanocomposite conformal corrosion barrier coating.

BACKGROUND OF THE INVENTION

Atmospheric corrosion remains a persistent and evasive challenge to the functional lifetime and performance of structural, decorative, electronic and high-tech materials. See G. Koch et al., International Measures of Prevention, Application, and Economics of Corrosion Technologies Study, NACE International IMPACT Report (2016). Films and coatings have long been used to combat corrosion by physically separating metals from the corrosive medium, or by inhibiting electrochemical reactions that drive corrosion. Ultrathin nanocomposite films fabricated by layer-by-layer (LbL) assembly form an emerging class of coatings with remarkable barrier performance. See M. A. Priolo et al., Nano Lett. 10(12), 4970 (2010); and P. Tzeng et al., J. Memb. Sci. 452, 46 (2014). LbL films are constructed by alternating deposition of complementary components by simple and scalable aqueous dip-coating or spraying processes. The components sequentially bind together with attractive forces (e.g., electrostatic interactions or hydrogen bonding). See J. J. Richardson et al., Chem. Rev. 116(23), 14828 (2016). Adjustments to component solution chemistry and process parameters enable precise control over film composition and architecture. The resulting versatility, conformal nature, gas impermeability, and thinness make LbL films attractive candidates for anti-corrosion coatings. Similarly, recent work has found that polyelectrolyte multilayer films considerably improve corrosion resistance of steel and light alloys by charge and mass transfer inhibition during immersion in salt water solutions, and even demonstrate self-healing properties when constructed with weak, mobile polyelectrolyte layers. See T. R. Farhat et al., Electrochem. Solid-State Lett. 5(4), B13 (2002); D. V. Andreeva et al., ACS Appl. Mater. Interfaces 2(7), 1954 (2010); P. C. Suarez-Martinez et al., Macromol. Mater. Eng. 302, (2017); and E. Faure et al., Langmuir 28(5), 2971 (2012).

Atmospheric corrosion concerns often arise in electronics applications, where thin, conformal and transparent coatings are often desired. Hydrogen sulfide is one of several sulfur-containing gases and air pollutants that are particularly corrosive to copper, with even ppb levels in the air causing breakdown of electronics. See T. Graedel et al., Corr. Sci. 25(12), 1163 (1985). Recent studies have attempted to address atmospheric corrosion of copper using graphene and graphene oxide as gas barriers. See J. Lei et al., ACS Appl. Mater. Interfaces 9(13), 11902 (2017); D. Prasai et al., ACS Nano 6(2), 1102 (2012); M. Schriver et al., ACS Nano 7(7), 5763 (2013); X. Xu et al., Adv. Mater. 30(6), 1702944 (2017); and M. Wang et al., Adv. Mater. 29(47), (2017). While these materials provide short term (hours) corrosion protection at ambient and elevated temperatures, their effectiveness diminishes over time due to infiltration by defects and, with humidity, catalysis of corrosion by the coating itself. See J. Lei et al., ACS Appl. Mater. Interfaces 9(13), 11902 (2017); M. Schriver et al., ACS Nano 7(7), 5763 (2013); and S. Matteucci et al., Transport of Gases and Vapors in Glassy and Rubbery Polymers, In Materials Science of Membranes for Gas and Vapor Separation; Yampolskii, Y.; Pinnau, I.; Freeman, B. D., Eds.; John Wiley & Sons: West Sussex, England, 2006; Chapter 1, pp 1-47.

SUMMARY OF THE INVENTION

The present invention is directed to conformal barrier coatings comprising layers of inorganic platelets dispersed in a polyelectrolyte polymer matrix for protection of metals against corrosive atmospheres. For example, polymer-clay nanocomposite (PCN) films comprising polyethyleneimine/poly(acrylic acid)/polyethyleneimine/montmorillonite clay (PEI/PAA/PEI/MMT) quadlayers can be sequentially deposited on copper, an important industrial metal, using a relatively simple layer-by-layer (LbL) dip-coat process. PCN films as thin as 90 nm effectively reduced the copper corrosion rate by more than 1000× when exposed to an aggressive $H_2S$-containing atmosphere. Mechanisms for this corrosion protection likely involve a combination of the PCN films acting as a gas permeation barrier and by protective chemical interactions with the copper. The PCN films offer several potential advantages as anti-corrosion coatings over graphene and other thin films (e.g., atomic layer deposited oxides), such as improved stability, minimization of through-film defects via the multi-step coating process, incorporation of electrically insulating clay constituents, and a simple and scalable deposition process.

BRIEF DESCRIPTION OF THE DRAWINGS

The detailed description will refer to the following drawings, wherein like elements are referred to by like numbers.

FIG. 2A is a graph of PCN coating thickness as a function of the number of PEI/PAA/PEI/MMT quadlayers (QLs) deposited (insets are atomic force microscope (AFM) topography maps of 6 and 10 QL coatings on copper). FIGS. 2B and 2C are transmission electron microscope (TEM) cross-sections of 2 QL and 10 QL coatings, respectively, on copper (arrows designate the number of layers). FIG. 2D is a schematic illustration of a multiple quadlayer thin film coating.

DETAILED DESCRIPTION OF THE INVENTION

Figure 1B:
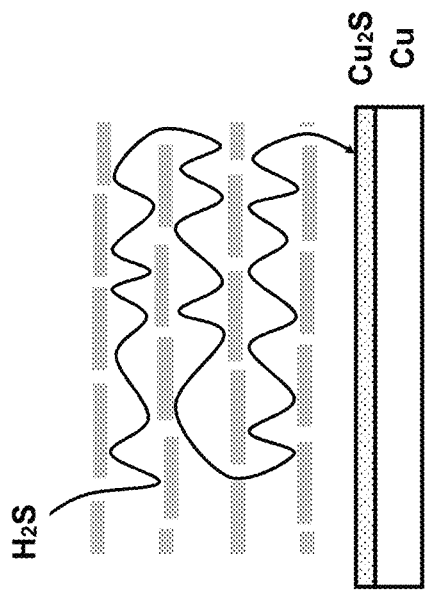
FIG. 1B is a schematic illustration of the tortuous path of an $H_2S$ molecule permeating through a multilayer PCN coating to a copper substrate.
Figure 1A:
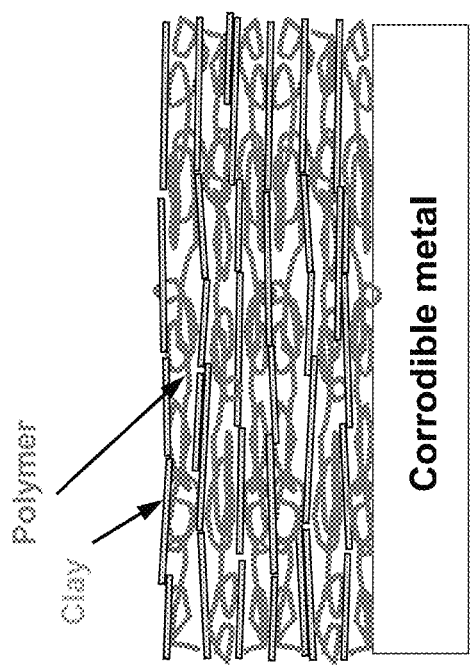
FIG. 1A is a schematic illustration of a LbL-deposited PCN coating with well dispersed and aligned clay platelets in a polymer matrix.

The corrosion protection technology of the present invention is based on thin films comprising multiple layers of inorganic platelets (i.e., a two-dimensional or lamella-type material), dispersed and oriented within a polyelectrolyte polymer matrix. For example, a polymer-clay nanocomposite (PCN) ordered thin film structure comprising alternating layers of highly aligned clay platelets (each ~1 nm thick) and polyelectrolytes deposited on a normally corrodible metal substrate is schematically illustrated in FIG. 1A. This thin film structure can be assembled through the layer-by-layer (LbL) deposition of alternating molecular layers of charged polymer and oppositely charged exfoliated clay platelets (e.g., montmorillonite (MMT), vermiculite (VMT), or laponite) or other large aspect ratio inorganic platelet materials (e.g, alumina, graphene, graphene oxide, boron nitride, or layered double hydroxides, etc.)). The nanocomposite films can be produced by sequential spraying or dipping in self-assembling component solutions. Using MMT clays as an example, the clay chemistry and structure can be systematically varied to provide specific technical clay characteristics desirable in optimized PCN thin film barriers. These optimized clay materials can then be paired with engineered polymers to create complementary interactions in the PCN thin film structures. For example, the polymer can be a commercially-available polyethyleneimine (PEI), which are strongly cationic. Other cationic polymer systems, such as the cationic equivalent to EVA, ethylene vinyl amine (a copolymer of ethylene and vinyl amine), can also be used. See J. Leonard et al., *Macromolecules* 45, 671 (2012). Alternatively, anionic polymers, such as poly(acrylic acid) (PAA) can be used together with cationic clays, such as layered double hydroxides (LDHs). Combinations of oppositely charged cationic and anionic polymers (e.g, cationic PEI and anionic poly(acrylic acid) (PAA)) can be combined with the inorganic platelets, to provide a layered polyelectrolyte barrier. See M. A. Priolo et al., *Nano Lett.* 12, 4970 (2010) and Y-H Yang et al., *RSC Advances* 2, 12355 (2012). The incorporation of both cationic and anionic polymers can provide independent influences reducing corrosion. See S. A. Umoren et al., *J Sol. St Electrochem.* 14(12), 2293 (2010). These mixed polymer systems also lend themselves to chemical crosslinking to increase the stability or tune the barrier properties of the composite films. Alternatively, the polyelectrolyte polymer matrix can comprise a charged polymer dispersion, such as polyurethane or epoxy. Any normally corrodible metal can be protected using these corrosion barrier coatings, including various steels, copper, brass, bronze, copper, iron, zinc, aluminum, magnesium, silver, nickel, and alloys thereof.

Coating properties can be controlled via materials selection (polymers/platelet materials) and layer arrangement. For example, the platelet composition, degree of platelet exfoliation, and platelet aspect ratio can be optimized to affect barrier properties, such as gas permeation. The platelets are effectively bricks held in place by a polyelectrolyte mortar, forming what may be considered a nanoscale "brick-and-mortar" wall. The oriented layers of platelets form a tortuous diffusion pathway for gaseous species. In previous work, Priolo et al. demonstrated flexible 500 nm thick polymer-clay films of this type as gas barriers with oxygen transmission rates of <0.005 cc/m² day and water vapor transmission of 0.75 g/m² day. See M. A. Priolo et al., *Nano letters* 10(12), 4970 (2010). These rates are several orders of magnitude less than micron-thick poly(p-xylylene) barrier coatings commonly used to protect microelectronics and medical devices against corrosion. See Licari, J. J., *Coating materials for electronic applications: polymers, processing, reliability, testing*; William Andrew: 2003. In the example shown in FIG. 1B, the slow permeation of $H_2S$ via the tortuous diffusion pathway through a PCN coating results in reduced sulfidation of the underlying copper substrate. Therefore, the relative impermeability of PCN coatings to corrosive species—imparted by the highly-organized platelet layers—can provide favorable corrosion protection over conventional coatings.

As an example, a PCN film architecture comprising highly organized, alternating polyelectrolyte layers of cationic branched polyethyleneimine (PEI) and anionic poly (acrylic acid) (PAA) and exfoliated montmorillonite clay (MMT) layers was used to examine the corrosion behavior of copper plates. Pure (99.95%) copper coupons were polished to a 1200 grit finish, etched in deoxygenated 6 M HCl and cleaned with deionized water (18.2 MΩ·cm). The aqueous component solutions for the PCN coating were 1.0 wt % exfoliated MMT, 0.1 wt % branched PEI ($M_w$~25,000 g/mol), and 0.2 wt % PAA ($M_w$~100,000 g/mol). All solutions were used with unaltered pH. Coatings were applied to coupons immediately after cleaning via dipping sequentially in the component solutions with a water rinse and compressed air-drying steps between each deposition step. See P. Tzeng et al., *J. Memb. Sci.* 452, 46 (2014). One complete deposition cycle (PEI/PAA/PEI/MMT) is referred to herein as a quadlayer (QL); several QL depositions were used to build up the described barrier films.

Films as thin as 4 QLs on polymers exhibit oxygen permeability orders of magnitude below that of $SiO_x$ and parylene (poly(chloro-p-xylylene)) coatings, rivaling that of metallized films. See M. A. Priolo et al., *Nano Lett.* 10(12), 4970 (2010). (Parylene is the trade name for a variety of chemical vapor deposited poly(p-xylylene) polymers used as moisture and dielectric barriers). The slightly larger kinetic diameter of $H_2S$ versus $O_2$ (3.6 and 3.5 Å, respectively) and exceptional impermeability of these QL PCN films, suggest these films could also serve as $H_2S$ corrosion barriers. See S. Matteucci et al., Transport of Gases and Vapors in Glassy and Rubbery Polymers. In *Materials Science of Membranes for Gas and Vapor Separation*; Yampolskii, Y.; Pinnau, I.; Freeman, B. D., Eds.; John Wiley & Sons: West Sussex, England, 2006; Chapter 1, pp 1-47; and P. Tzeng et al., *Macromol. Rapid Comm.* 36(1), 96 (2015). As described below, PCN films as thin as 90 nm can indeed reduce copper corrosion rates by >1000× in a highly corrosive $H_2S$ atmosphere. This performance exceeds that of conformal coatings of microns-thick vapor-deposited parylene commonly used in industry today. LbL coatings provide other notable practical benefits, including low-cost, a simple and scalable deposition process, and avoidance of highly toxic constituents (e.g., hexavalent chromium).

The growth and structure of the QL films on polished copper coupons is shown in FIG. 2A. The graph in FIG. 2A shows that film thickness exhibits exponential-type growth with increasing QLs, similar to trends observed in previous studies for deposition of QL films on non-metal substrates. See M. A. Priolo et al., *Nano Lett.* 10(12), 4970 (2010); and P. Tzeng et al., *J. Memb. Sci.* 452, 46 (2014). The surface topography of the 2 QL and 6 QL coatings was relatively smooth, with a few particulate features, as evident in the AFM image inset in FIG. 2A. In contrast, the 10 QL coatings exhibited a strong texture with a wavelike pattern. A similar pattern was observed on 20 bilayer (BL) coatings of PEI/PAA (i.e., 10 QLs without clay) on copper. This texturing is notably different than the smooth morphologies reported in previous studies for comparable film thicknesses on non-metal substrates. See M. A. Priolo et al., *Nano Lett.* 10(12), 4970 (2010); and P. Tzeng et al., *J. Memb. Sci.* 452, 46 (2014). It is, however, consistent with results of Cao and coworkers, who showed that similar wave-like patterns could be achieved for PEI/PAA films of 6 to 12 BL on silicon by immersion in 10 mM $Cu^{2+}$. See M. Cao et al., *Langmuir* 23(6), 3142 (2007). They attributed this to coordination of $Cu^{2+}$ with the carboxylate groups of the PAA and chelation by amine groups of PEI, causing coating restructuring. A similar mechanism is likely operative for the QL and BL films herein, where some amount of $Cu^{2+}$ would be expected to be present when applying the PCN coating to a copper substrate.

Cross-sectional scanning transmission electron micrographs (STEM) of the films on copper, shown in FIGS. 2B and 2C, reveal layers of exfoliated clay platelets intercalated within compact polymer layers through 6 QL. Above 6 QL, there is an evident change in the film texture, showing significantly thicker polymer layers and a less ordered composite structure above 6 QL. The trend of increasing polymer layer thickness with increasing QL is a phenomenon observed in previous studies of this PCN architecture and is attributed to the interdiffusion of PEI and PAA during deposition. See M. A. Priolo et al., *Nano Lett.* 10(12), 4970 (2010). The thicker and less aligned clay layers above 6 QL along with the wavy topography may be related to the copper ion effect discussed above. See M. Cao et al., *Langmuir* 23(6), 3142 (2007). An idealized schematic of a multilayer QL structure and the variation in polymer layer thickness is illustrated in FIG. 2D. The organized, oriented composite structure creates a highly tortuous pathway for corrosive gas species. Furthermore, clay loadings in these films are an order of magnitude higher than have been achieved in conventional, bulk nanocomposites, including clay- and graphene-based, used as corrosion barrier coatings (e.g., 26 wt % for 5 QL). See M. A. Priolo et al., *Nano Lett.* 10(12), 4970 (2010); J.-M. Yeh et al., *Chem. Mater.* 13(3), 1131 (2001); and C.-H. Chang et al., *Carbon* 50(14), 5044 (2012). Increased particle loading and degree of orientation are known to increase the effectiveness of conventional nanocomposite anti-corrosion coatings by serving as mass transport barriers to corrosive species.

Figure 3A:
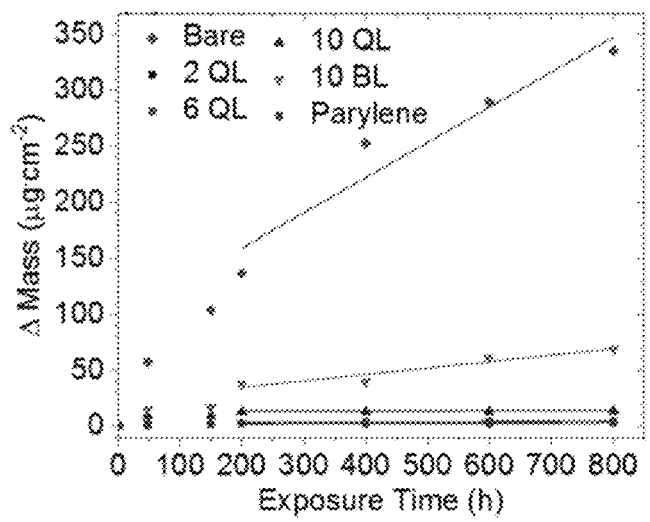
FIG. 3A is a graph of mass gain of bare and coated copper and FIG. 3B is a graph of mass gain of glass plates during exposure to hydrogen sulfide atmosphere, with linear fits of the 200-800 h exposure period.
Figure 3B:
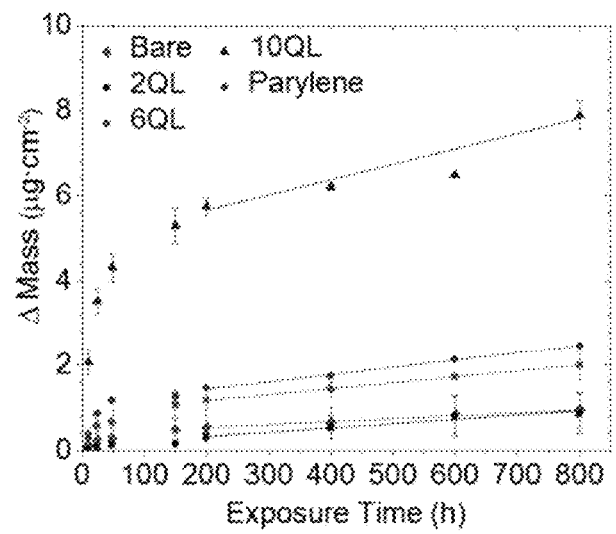

To assess the protective character of these PCN coatings, coated and uncoated samples were exposed to flowing air at 75% RH and 30° C. with 10 ppb $H_2S$, based on standard accelerated corrosion tests for copper electronic components. See Designation, A. B845-97: Standard Guide for Mixed Flowing Gas (MFG) Tests for Electrical Contacts. *American Society for Testing and Material* 1997. Increases in sample mass resulting from the formation of sulfidation products provide a reliable metric for the rates of corrosion of the coated and uncoated samples. The mass gain of copper coupons seen in FIG. 3A ($\Delta m_{total}$) is primarily the result of reaction of copper with sulfur species to form $Cu_2S$ ($\Delta m_{substrate}$) and, for coated samples, uptake of gaseous species (e.g., water or $H_2S$) by the coating itself ($\Delta m_{film}$); where $\Delta m_{total}=\Delta m_{substrate}+\Delta m_{film}$. To determine the relative contribution of $\Delta m_{film}$, coated and uncoated glass plates were also exposed to $H_2S$, in which the glass plates were not expected to substantially react with the $H_2S$ and gain mass ($\Delta m_{substrate}=0$), as shown in FIG. 3B. Therefore, the mass gain seen in this figure is the result of gases chemically or physically sorbed to the PCN itself. As shown in FIG. 3A, the substrate mass gain rate is fast at the initial stage of exposure (~10 to 200 h), but then slows and becomes relatively linear with time after (>200 h). This is qualitatively consistent with power-law type behavior of copper sulfidation in similar laboratory environments and also reflective of the initially fast uptake of gas species by the films themselves. See J. C. Barbour et al., *Mechanisms of Atmospheric Copper Sulfidation and Evaluation of Parallel Experimentation Techniques*; SAND2002-0699; Sandia National Labs. (2002).

Figure 3C:
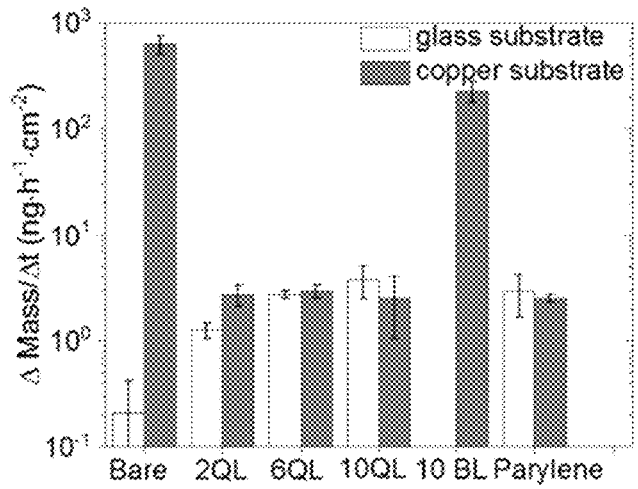
FIG. 3C is a graph of mass gain rates of copper and glass substrates with different treatments derived from linear regressions in FIGS. 3A and 3B. Error bars are the standard error of the regression slopes.

Linear fits of mass gain versus time over the 200 to 800 h exposure range in FIGS. 3A and 3B were used to estimate steady-state mass gain rates on the copper and glass samples. Given the relatively negligible mass gain of the bare glass samples, values for the coated glass samples in FIG. 3B are indicative of $\Delta m_{film}/\Delta t$. These values show increasing mass gain rate with number of QL. Subtracting the coated glass values ($\Delta m_{film}/\Delta t$) from the corresponding coated copper values ($\Delta m_{total}/\Delta t$) reveals of the mass gain associated with copper corrosion ($\Delta m_{substrate}/\Delta t$), in other words, the copper corrosion rate. It is clear in FIG. 3C that 6 and 10 QL coatings reduced corrosion rate by a factor of >1000× compared to the bare copper plates. These rates are on par with samples coated with much thicker (2.6 μm) parylene-C, a vapor-deposited conformal coating commonly used in industry. The mass gain of copper coated with 10 BL of PEI/PAA (1.8 μm thick), which is essentially 10 QL without clay, was only ~3× less than that of the uncoated copper coupons, showing that incorporation of clay in these films is vital to performance.

Figure 4B:
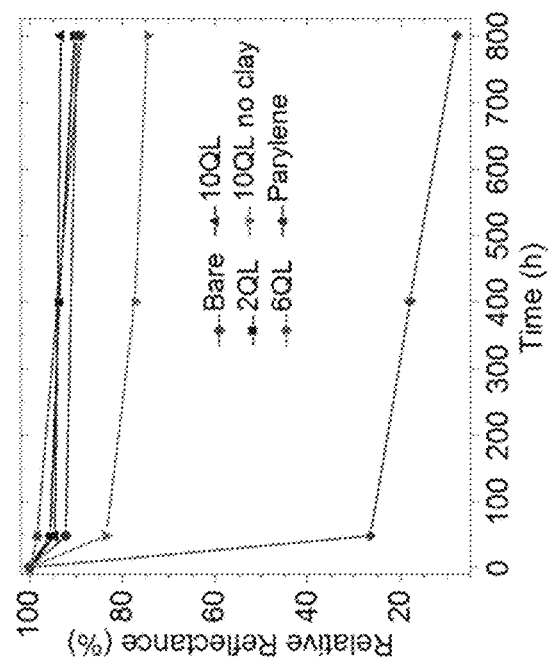
FIG. 4B is a graph of the change in reflectance integrated across 400-1000 nm for all copper treatments during exposure.
Figure 4A:
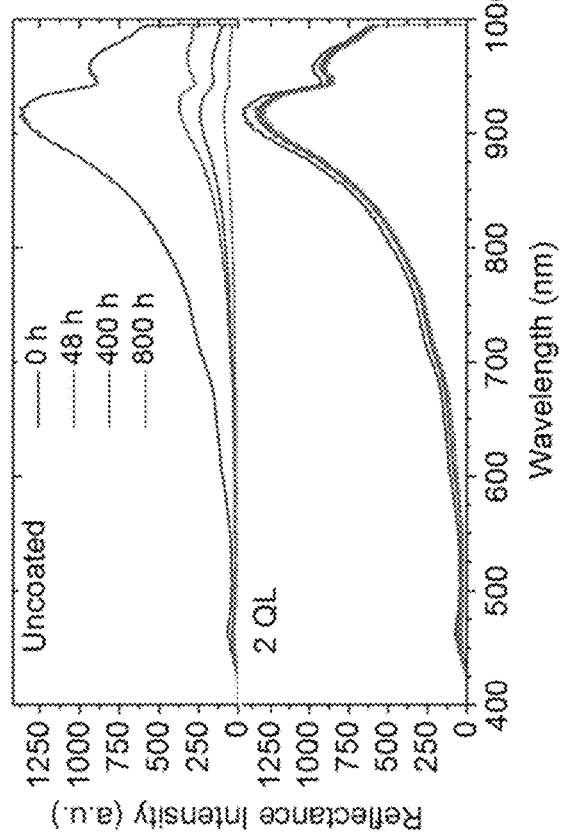
FIG. 4A is a graph of reflectance of uncoated and 2 QL-coated copper during exposure to hydrogen sulfide atmosphere.
Figure 4C:
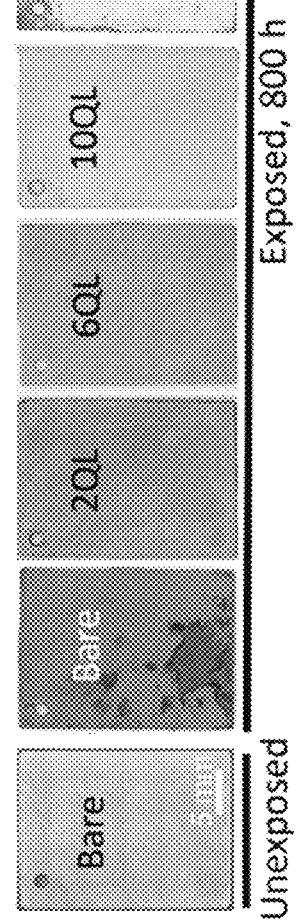
FIG. 4C are images of an uncoated (bare) plate before exposure and all plate types after 800 h exposure. Plate size is 1.9×2.5 mm.

The qualitative visual appearance and quantitative optical reflectance measurements show similar trends in corrosion performance, but further distinguish 10 QL as the top performer, maintaining the brightest visual appearance and least change in reflectivity, as shown in FIGS. 4A-C. In reflectance measurements, the degree of sulfidation is revealed by a decrease in light reflected from the highly polished metal surface as dark, broadly absorbing copper sulfide grows over the sample surface. As shown in the upper graph in FIG. 4A, reflectance intensity of bare copper clearly decreases with corrosive exposure time across the measured wavelength range (400 to 1000 nm), which is attributed to absorbance of thickening copper sulfide over time. See D. Koch and R. McIntyre, *J. Electroanal. Chem. Interfacial Electrochem.* 71(3), 285 (1976). The PCN coated samples exhibited considerably reduced decreases in reflectivity with extended $H_2S$ exposure time as exemplified by the data for 2 QL-coated copper in the lower graph in FIG. 4A. The difference in reflectivity is more evident in FIG. 4B, which compares the relative reflectance of the samples versus the unexposed condition, calculated as the integration of each spectrum at a given time-step divided by the initial reflectance of each sample. From this plot, 10 QL is the best performer, maintaining 93±1% of its original reflectance after 800 hours.

These results are also visually apparent, with the 10 QL maintaining a bright, untarnished appearance after 800 h exposure, as shown in FIG. 4C. This is in stark contrast to the bare plate, which is covered in a black, spalling corrosion product after H₂S exposure, indicative of the highly aggressive nature of this test. Images of the 10 BL (no clay) samples show attack occurred around the edges and discrete points across the coating surface, again demonstrating the importance of clay in this coating. It is notable that reflectance measurements of the 10 BL samples were taken away from the highly corroded edges. It is also notable that the 10 QL sample is pinker in color than the other samples. The QL coatings were found to reflect strongest in the redder end of the visible spectrum with reflectance decreasing with thickness.

The QL films likely protects the copper by both decreasing the diffusion rate of $H_2S$ to the copper surface and slowing the electrochemical kinetics of copper sulfidation. Assuming all $H_2S$ that permeated through the 6 and 10 QL films reacted with the copper to form $Cu_2S$, permeation rates would be <0.5 cc·m$^{-2}$ day$^{-1}$atm$^{-1}$ according to the mass gain results. On a per-thickness basis, this rate is over three orders of magnitude lower than $H_2S$ permeation reported for all-polymer films. See L. W. McKeen, *Permeability Properties of Plastics and Elastomers*, William Andrew: Oxford, 2012; T. Merkel and L. Toy, *Macromolecules* 39(22), 7591 (2006); and W. Heilman et al., *Ind. Eng. Chem.* 48(4), 821 (1956). As with parylene and other anti-corrosion polymer coatings, the polymer components (PEI and PAA) of the QL films likely suppress the corrosion electrochemical kinetics. The amine groups in PEI may serve to form strong coordinate bonds with copper as electron donors. See P. G. Ganesan et al., *Appl. Phys. Lett.* 83(16), 3302 (2003); and M. Antonijevic and M. Petrovic, *Int. J. Electrochem. Sci.* 3(1), 1 (2008). Moreover, PAA is known to strongly coordinate with copper and immobilize Cu(II) ions through interaction with its —COOH groups. These characteristics are generally known to contribute to corrosion inhibition effectiveness. See M. Cao et al., *Langmuir* 23(6), 3142 (2007); P. G. Ganesan et al., *Appl. Phys. Lett.* 83(16), 3302 (2003); and M. Antonijevic and M. Petrovic, *Int. J. Electrochem. Sci.* 3(1), 1 (2008). The ability of the PEI/PAA BL films to maintain some discrete highly reflective areas, as seen in FIG. 4C, is suggestive of their effectiveness as inhibiting polymers. Clearly, though, the integrity and efficacy of the films is enhanced in the clay-containing composite structures. LbL deposition of PCN coatings therefore enables a system that inhibits both diffusion of corrosive gases and electrochemical corrosion kinetics.

The present invention has been described as a nanocomposite conformal corrosion barrier coating. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A corrosion barrier coating, comprising at least one layer of dispersed and aligned inorganic platelets in a polyelectrolyte polymer matrix deposited on a corrodible metal substrate.

2. The coating of claim 1, wherein the inorganic platelets comprise clay platelets.

3. The coating of claim 2, wherein the clay platelets comprise montmorillonite, vermiculite, or laponite.

4. The coating of claim 1, wherein the inorganic platelets comprise alumina, graphene, graphene oxide, boron nitride, or a layered double hydroxide.

5. The coating of claim 1, wherein the at least one layer of dispersed and aligned inorganic platelets in a polyelectrolyte polymer matrix comprises a layer of dispersed and aligned clay particles deposited on a polyelectrolyte polymer layer.

6. The coating of claim 5, wherein the clay platelets are anionic and the polyelectrolyte polymer layer comprises a cationic polymer layer.

7. The coating of claim 6, wherein the cationic polymer comprises polyethyleneimine or ethylene vinyl amine.

8. The coating of claim 6, wherein the polyelectrolyte polymer layer further comprises an anionic polymer layer.

9. The coating of claim 8, wherein the anionic polymer comprises poly(acrylic acid).

10. The coating of claim 1, wherein the at least one layer of dispersed and aligned inorganic platelets in a polyelectrolyte polymer matrix comprises at least one quadlayer, each quadlayer comprising a layer of montmorillonite deposited on a polyelectrolyte layer, the polyelectrolyte layer comprising a layer of polyethyleneimine deposited on a layer of poly(acrylic acid) deposited on a layer of polyethyleneimine.

11. The coating of claim 10, wherein the corrosion barrier coating comprises at least six quadlayers.

12. The coating of claim 5, wherein the clay platelets are anionic and the polyelectrolyte polymer layer comprises a cationic polymer layer.

13. The coating of claim 1, wherein the at least one layer of dispersed and aligned inorganic platelets in a polyelectrolyte polymer matrix is deposited by a layer-by-layer deposition process.

14. The coating of claim 1, wherein the corrodible metal substrate comprises copper.

15. The coating of claim 1, wherein the corrodible metal substrate comprises steel, brass, bronze, iron, zinc, aluminum, magnesium, silver, nickel, and alloys thereof.

* * * * *